(12) United States Patent
Bird

(10) Patent No.: US 11,473,553 B2
(45) Date of Patent: Oct. 18, 2022

(54) WAVE PROTECTION AND ENERGY GENERATION SYSTEMS AND ASSEMBLIES

(71) Applicant: Gregory Francis Bird, Milwaukee, WI (US)

(72) Inventor: Gregory Francis Bird, Milwaukee, WI (US)

( * ) Notice: Subject to any disclaimer, the term of this patent is extended or adjusted under 35 U.S.C. 154(b) by 0 days.

(21) Appl. No.: 17/212,803

(22) Filed: Mar. 25, 2021

(65) Prior Publication Data

US 2021/0301779 A1 Sep. 30, 2021

Related U.S. Application Data

(60) Provisional application No. 62/994,330, filed on Mar. 25, 2020.

(51) Int. Cl.
*F03B 13/22* (2006.01)

(52) U.S. Cl.
CPC .................................. *F03B 13/22* (2013.01)

(58) Field of Classification Search
CPC ...... F03B 13/22; F03B 13/266; F03B 13/188; F03B 13/24; F03B 13/148; F03B 13/1895
See application file for complete search history.

(56) References Cited

U.S. PATENT DOCUMENTS

| | | |
|---|---|---|
| 1,615,619 A | 1/1927 | Finne |
| 2,501,696 A | 3/1950 | Souczek |
| 4,123,667 A | 10/1978 | Decker |
| 4,306,157 A | 12/1981 | Wracsaricht |
| 4,486,143 A | 12/1984 | McVey |
| 4,494,007 A | 1/1985 | Gaston |
| 5,380,149 A | 1/1995 | Valsamidis |
| 6,443,653 B1 | 9/2002 | Zingale |
| 7,014,416 B2 | 3/2006 | Lund |
| 7,215,036 B1 | 5/2007 | Gehring |
| 7,221,164 B1 | 5/2007 | Barringer |
| 7,235,893 B2 | 6/2007 | Platt |
| 7,489,046 B2 | 2/2009 | Costin |
| 7,573,148 B2 | 8/2009 | Nica |
| 8,687,980 B2 | 4/2014 | Peng et al. |
| 8,692,404 B2 | 4/2014 | Chauvin |
| 8,736,096 B2 | 5/2014 | Kiyose et al. |

(Continued)

FOREIGN PATENT DOCUMENTS

| | | |
|---|---|---|
| EP | 1 654 458 | 6/2007 |
| EP | 3 426 913 | 10/2019 |

OTHER PUBLICATIONS https://www.energy.gov/eere/water/wave-energy-prize-teams viewed Apr. 5, 2021.

(Continued)

*Primary Examiner* — Viet P Nguyen
(74) *Attorney, Agent, or Firm* — Andrus Intellectual Property Law, LLP

(57) ABSTRACT

A system for generating energy from waves in a body of water includes a resilient fluid container that contains a fluid. When the fluid container is compressed and decompressed, the fluid flows out of and into the fluid container. A panel is configured to move relative to the fluid container as the waves act on the panel such that the panel acts on and compresses the fluid container. An energy generating device generates electrical energy as the fluid flows out of fluid container.

17 Claims, 13 Drawing Sheets

(56) References Cited

U.S. PATENT DOCUMENTS

| | | | |
|---|---|---|---|
| 10,316,481 | B2 | 6/2019 | Lorenzi et al. |
| 2006/0202483 | A1 | 9/2006 | Gonzalez |
| 2010/0133842 | A1 | 6/2010 | Lin |
| 2010/0140945 | A1 | 6/2010 | Andujar |
| 2010/0209236 | A1 | 8/2010 | Freeman et al. |
| 2010/0308590 | A1* | 12/2010 | Rohrer .................. F03B 13/188 290/53 |
| 2015/0091304 | A1 | 4/2015 | Madhi et al. |
| 2020/0232442 | A1 | 7/2020 | Bird |

OTHER PUBLICATIONS

International Search Report and Written Opinion dated Jun. 28, 2021, in co-pending PCT application PCT/US2021/024188.

https://www.rechargenews.com/transition/landmark-in-stream-tidal-power-pilot-off-japan-in-water-later-this-year/2-1-749299 viewed Feb. 4, 2020.

https://ece.nmsu.edu/research/hyper/ Hydropower Energy Resource Harvester Installation viewed Feb. 2, 2020.

https://simecatlantis.com/projects/meygen/ Tidal Stream Projects viewed Feb. 4, 2020 viewed Feb. 6, 2020.

https://ieeexplore.IEEE.org/document/1508997 A Novel Hydropower Harvesting Device viewed Feb. 6, 2020.

https://www.ge.com/reports/go-with-the-flow-these-engineers-are-building-a-fish-friendly-hydropower-plant/ Go with the Flow: These Engineers are bilding a Fish-Friendly Hydropower Plant—GE Reports viewed Feb. 7, 2020.

https://www.mocean.energy/wave-energy-converter/ Wave energy Converter, Mocean pioneering wave technology viewed Feb. 12, 2020.

https://www.asme.org/topics-resources/content/fish-safe-turbines-empower-small-dam-hydro-projects?utm_campaign=Newsletter&utm_source=hs_email&utm_medium=email&utm_content=82683485&_hsenc=p2ANqtz—4gGQoTQ-hNGNbe7aUrdetNkl_JrtZYiceL0TOk8-sz8soGSp26SR7T-xwKcC9E3pGEO35IEVW9F-bz4Da7kXv8B7_gFish-Safe Turbines Empower Small-Dam Hydro Projects—ASME viewed Mar. 28, 2020.

https://www.waveswell.com/ Sustainable Electricity From the Ocean viewed Apr. 12, 2020.

https://orbitalmarine.com/technology-development/catching-the-tide/ orbital-o2 Orbital Marine Power | World's Most Powerful Tidal Turbine viewed Apr. 15, 2020.

https://finance.yahoo.com/news/learning-past-three-generations-wave-123501472.html viewed Nov. 9, 2020.

Drye, Willie, "Turning River Current Into Electricity", National Geographic, published Mar. 22, 2010, retrieved from https://www.nationalgeographic.com/science/article/river-current-electricity on Feb. 19, 2021.

"How Hydrokinetic Energy Works", Union of Concerned Scientists, published Jul. 14, 2007, updated Apr. 28, 2008, retrieved from https://www.ucsusa.org/resources/how-hydrokinetic-energy-works on Feb. 19, 2021.

Morbiato, Tommaso, "Design Concepts of Hydrokinetic Turbines, with an Emphasis on Performance in Variable Flows", SAARC Energy Seminar, Submersible Turbines in Canals and Assessment of Resource Potential, presented Feb. 8-9, 2018, retrieved from https://www.saarcenergy.org/wp-content/uploads/2018/02/Design-concepts-of-Hydrokinetic-Turbines-Performance-in-variable-flows-by-Tommaso-Morbiato..pdf on Feb. 19, 2021.

Givetash, Linda, "Tidal Energy Pioneers See Vast Potential in Ocean Currents' Ebb and Flow", NBC News, MACH, published Mar. 25, 2019, retrieved from https://www.nbcnews.com/mach/science/tidal-energy-pioneers-see-vast-?otential-ocean-currents-ebb-flow-ncna981341 on Feb. 19, 2021.

"Energy Kite Promises a New Way to Harness Wind Power", NBC News, MACH, uploaded Jan. 28, 2019, retrieved from https://www.nbcnews.com/mach/video/energy-kite-promises-a-new-way-to-harness-wind-power-1433286723625 on Feb. 19, 2021.

Sullivant, Rosemary, "Turning the Tide to Energy: New Concept Could Harness the Power of Ocean Waves", NASA, published Mar. 5, 2009, retrieved from https://www.nasa.gov/topics/earth/features/tideenergy.html on Feb. 19, 2021.

'Optimised performance for barrage and lagoon hydro turbines, https://tidetec.com viewed Mar. 22, 2021.

Wave Energy Power Drives, http://www.wetgen.com viewed Mar. 22, 2021.

Wells turbine, Widipedia, https://en.m.wikipedia.org/wiki/Wells_turbine viewed Mar. 22, 2021.

Two-way Turbine Flowmeter, https://www.diytrade.com/china/pd/9712851/Two_way_Turbine_Flowmeter.html viewed Mar. 22, 2021.

Siren Whistle, https://www.autismcommunitystore.com/siren-whistle viewed Mar. 22, 2021.

Marine current power, https://en.m.wikipedia.org/wiki/Marine_current_power viewed Mar. 22, 2021.

P154 Hydrokinetic Turbine, https://www.guinard-energies.bzh/en/our-technology/20-kw-hydrokinetic-turbine-project/ viewed Mar. 22, 2021.

Zarubin, Bobby, Ocean Current Energy: Unterwater Turbines, Jan. 24, 2015 Stanford University, http://large.stanford.edu/courses/2014/ph240/zarubin2/ viewed Mar. 22, 2021.

Hydrokinetic and ultra-low head turbines in rivers: A reality check, Energy for Sustainable Development, vol. 52, Oct. 2019, pp. 1-10, https://www.sciencedirect.com/science/article/pii/S0973082619304958?via%3Dihub viewed Mar. 22, 2021.

Smart Hydro Power, Smart Turbines, https://www.smart-hydro.de/renewable-energy-systems/hydrokinetic-turbines-river-canal/ viewed Mar. 22, 2021.

Hydroquest, https://www.hydroquest.net/river-current-turbine-range-river-hydrokinetic-turbine/ viewed Mar. 22, 20221.

LucidEnergy.com, How it Works, http://lucidenergy.com/how-it-works/ viewed Mar. 22, 2021.

The Push for Tidal Power Faces its Biggest Challenge Yet, https://www.smithsonianmag.com/innovation/push-tidal-power-face-biggest-challenge-180974369/ viewed Mar. 22, 2021.

DynaTect Equipment Protection, Hybrid Long Travel Support System, Dynatect-Gortrac-Hybrid-Brochure.pdf viewed Mar. 22, 2021.

Ciringione, Joe, The Fabricator, Sep. 13, 2010, The evolution of cable carriers, thefabricator.com, viewed Mar. 22, 2021.

Dias, Frederic, Oscillating Wave Surge Converters, Dec. 14, 2015, http://mathocean.math.cnrs.fr/presentations/Dias.pdf, viewed Mar. 30, 2021.

Henry, et al, The Vertical Distribution and Evolution of Slam Pressure on an Oscillating Wave Surge Converter, Oct. 21, 2015, https://asmedigitalcollection.asme.org/OMAE/proceedings-abstract/OMAE2015/56475/V001T01A034/279641, viewed Mar. 30, 2021.

Screenshots of video footage of the Oyster 800 wave energy machine, Aquamarine Power, Jul. 22, 2013, https://www.theguardian.com/environment/video/2013/jul/22/oyster-800-massive-waves-video, viewed Mar. 30, 2021.

* cited by examiner

WAVE PROTECTION AND ENERGY GENERATION SYSTEMS AND ASSEMBLIES

CROSS REFERENCE TO RELATED APPLICATION

The present disclosure is based on and claims priority to U.S. Provisional Patent Application No. 62/994,330 filed Mar. 25, 2020, the disclosure of which is incorporated herein by reference.

FIELD

The present disclosure relates to energy generation, and specifically to systems and assemblies for generating energy from waves and protecting shorelines or dock walls from destructive wave action.

BACKGROUND

Shorelines are subject to erosion, and rising sea levels may further impact erosion at shorelines. Furthermore, shorelines may be impacted by energy-filled but destructive wave action. As such, protective devices, such as dock panel system and retention walls, can help protect the shorelines from erosion.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In certain examples, a system for generating energy from waves moving in a body of water includes a resilient fluid container that contains a fluid. When the fluid container is compressed, the fluid flows out of the fluid container, and when the fluid container decompresses, the fluid container resumes normal shape and allows the fluid to flow into the fluid container. A panel is configured to move relative to the fluid container as the waves act on the panel such that the panel acts on and compresses the fluid container. An energy generating device generates electrical energy as the fluid flows through the fluid container.

Various other features, objects, and advantages will be made apparent from the following description taken together with the drawings.

BRIEF DESCRIPTION OF THE DRAWINGS

The present disclosure is described with reference to the following Figures. The same numbers are used throughout the Figures to reference like features and like components.

DETAILED DESCRIPTION

Since earliest times people have tried to secure shorelines from effects of erosion and for vessel docking. With increasing urbanization, trade, and need for fuel-free energy, industrial technologies are being and have been developed to work efficiently in shoreline environments. Such developments are also in response to climate warming and consequent sea level rise that directly impact shorelines and shoreline structures. Some example technologies that have been developed to address these issues include dock panel fender systems having elastomeric shock absorbing cone fenders, large inflatable tubes for suspending ships for drydock work, multiple elastomeric, reinforcement layering and forming in the form of fenders and/or transportation tires, joining systems having injection molded pipe with formed ends for lockable connections, additive manufacturing allowing internal structures for tubes, robust hoses and cable/hose carrier technologies, spinning generator systems for turbine-driven generating electrical power, and the like.

The present inventor has endeavored to develop improved systems and assemblies for protecting shorelines and generating energy from waves. Thus, the present inventor has developed the systems and assemblies of the present disclosure.

Figure 1:
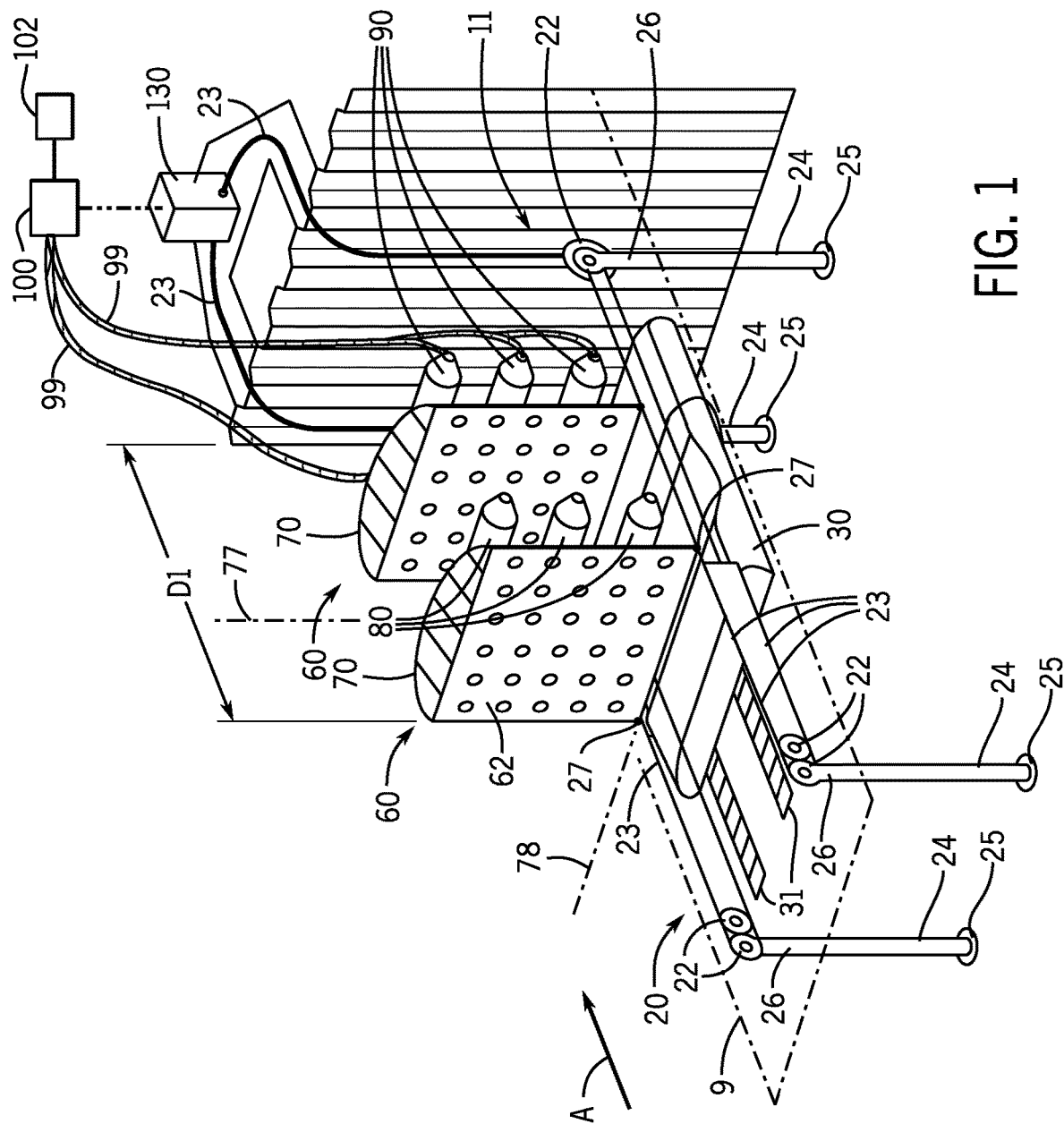
FIG. 1 is a perspective view of an exemplary system according to the present disclosure.

FIG. 1 depicts an exemplary system 10 of the present disclosure. The system 10 is for protecting shorelines and/or dock systems (e.g., dock walls 8) and generating energy as waves act on the system 10. The system 10 includes a support structure 20 that vertically supports one or more panel assemblies 60 in the body of water (e.g., lake, river, ocean). As will be described in greater detail hereinbelow, the support structure 20 is moveable to thereby change the position of the panel assemblies 60 relative to the dock wall 8 or shoreline.

The support structure 20 of the system 10 depicted in FIG. 1 generally exemplarily includes attachments to which a drive assembly 11, such as a cable pulley system or cable carrier, couples to the support structure 20 and moves the support structure 20 and connected components (e.g., panel assemblies) away from and toward the shoreline or the dock wall 8. The drive assembly can include one or more anchored offshore pulleys corresponding to drive connectors, driven pulleys corresponding with a drive connector attached at near shore anchors and having connections to power transmission systems that are activated by one of several methods (e.g., compressed air tool shaft, electrical motor shaft, extension shaft attached to shore or parked vehicle based power, drive pulley attached to power drive connector belt with motor mounted on parked vehicle, hydraulic power system, etc.).

In one specific example, the support structure 20 includes a series of pulleys 22 and a cable 23. The pulleys 22 are anchored to the sea floor 9 with anchors 24. The anchors 24 are exemplarily rods with an enlarged first end 25 that are embedded in the sea floor 9 and an opposite second end 26 coupled to one of the pulleys 22. The cable 23 extends generally vertically along the dock wall 8 and horizontally along the sea floor 9. The cable 23 is connected to a cable winding and unwinding vehicle or machine 130 (e.g., crane). The machine 130 is capable of winding the cable 23 onto a spool or unwinding the cable 23 from the spool to thereby move the panel assemblies 60 vis the pulleys 22 relative to the dock wall 8 (e.g., operation of the machine 18 causes the distance D1 between the panel assembly 60 and the dock wall 8 to change). In certain examples, the cables 23 have ends 27 that are coupled to the support structure 20 or the panel assembly 60. The panel assemblies 60 may be moved relative to the dock wall 8 for various reasons including moving the panel assemblies 60 into a position for greatest energy generation creating passage protected from large waves for small draft vessels to get to shore and retracting the panel assemblies 60 toward the dock wall 8 so that a large ship can dock next to the dock wall 8 which panel assemblies 60 may also be connected together for walkways without limit.

In the exemplary embodiment depicted in FIG. 1, the support structure 20 includes a sled 30 that is coupled to the panel assemblies 60. The support structure 20 also includes a track 31 along which the sled 30 is moved by an actuator (not depicted). Thus, the panel assemblies 60 are movable along the track 31 with the panel assemblies 60. In another exemplary embodiment, a cable carrier 140 (see FIG. 7, described further hereinbelow) has an end coupled to the support structure 20, and the cable carrier 140 moves the support structure 20 and the panel assemblies 60 relative to the dock wall 8 as the cable carrier 140 is moved relative to the dock wall 8. In another exemplary embodiment, the panel assemblies 60 are moved as the cable 23 is wound or unwound from a spindle on a machine 130.

In another exemplary embodiment, the sled 30 is capable of being moved (e.g., dragged) along the sea floor 9 as the attached drive assembly 11 is operated or moved by the machine 130. The sled 30 can exemplarily be filled with water and/or compressed air for ballast. In certain exemplary embodiments, the panel assemblies 60 are coupled to sled 30 so that the panel assemblies 60 and the sled 30 are moved together and the panel assemblies 60 can be moved into an optimal orientation to protect the dock wall 8 from perpendicular or oblique waves that move relative to the dock wall 8 and to maximize energy generation. In one example, the panel assemblies 60 are rotatable about a vertical axis (see for example vertical axis 77 on FIG. 1) such that the panel 62 is oriented to face the wave and/or the panel 62 extends parallel to the dock wall 8 or transverse to the dock wall 8. In another example, the panel assemblies 60 are pivotable about a horizontal axis 78 (see FIG. 1) such that the panel 62 can be pivoted relative to the support structure 20 and the sled 30. In certain examples, the sled 30 defines an interior void in which compressed air can be dispensed to thereby increase the buoyancy of the sled 30 and the panel assemblies 60 coupled thereto. As such, in this example, the sled 30 can be easily moved along the sea floor 9 or the track 31 by increasing the buoyancy of the sled 30. In other exemplary embodiments, safety and/or anchor chains are utilized keep the panel assemblies 60 properly oriented in vertical position and from breaking from moorings and from each other when stacked.

The number of panel assemblies 60 coupled to the support structure 20 can vary, and in the exemplary embodiment depicted in FIG. 1, two panel assemblies 60 are coupled to the support structure 20. Each panel assembly 60 includes a panel 62, a frame 70 that supports the panel 62, and one or more resilient fluid containers 80 coupled to the frame 70 with one or more bands 72 (see also FIG. 2 for further details of the panel assembly 60). The bands 72 are elastic and permit the panel 60 and the frame 70 to move relative to the fluid container 80, however, the bands 72 prevent excessive movement of the frame 70 relative to the fluid containers 80. The bands 72 wrap around a portion of the frame 70 and the outer surface of the fluid containers 80 such that the frame 70 and the fluid containers 80 are movable relative to each other without decoupling from each other. In certain exemplary embodiments, the bands 72 are large lifting straps. The shape of the fluid containers 80 can vary (e.g., cube, spheroid), and in the example depicted in FIG. 1-2 the fluid containers 80 are tubes that extend along a longitudinal center axis between opposing ends.

A person of ordinary skill in the art will recognize that multiple panel assemblies 60 may be arranged relative to each other and the dock wall 8 (e.g., stacked on the support structure 20, positioned on sea floor 9). Furthermore, the support structure 20 may be a rigid frame with a system of cables 23 and pulleys 22 that are anchored or screwed at the bottom of dock wall 8 thereby allowing tight positioning against dock wall 8 so that ships can tie up to the dock wall 8, offshore positioning spaced as a coral reef allowing vessels to dock adjacent to dock wall 8 with calmer wave action, or along unprotected shores with anchors screwed into bed that also may be positioned by moveable equipment acting on the cables 23, or by onboard equipment. The panel assemblies 60 can also be arranged in back-to-back fashion with a top deck (not depicted) on top for the frames 70 and/or towed as floats of stacked panel assemblies 60 to far offshore anchorages, or fixed to bottom offshore, or robotically placed, without limit.

In an exemplary embodiment, the lower end corners of the panel 62 and/or the frame 70 are fixedly coupled to the cable carrier end 122 (see FIG. 7) of the support structure 20 with side-mounted center-affixed enclosed disk brake or friction brake. In this exemplary embodiment, the fixed attachments generate steam in strong kinetic conditions to expand brake components to lock joint with panel assemblies 60 in vertical maximum wave resistant configuration, or to which, for keeping the panel assemblies 60 when deployed moving freely in low waves mostly in the vertical direction, and using a progressively resistant roller/clamp power generator when wave conditions strengthen.

The panels 62 have perforations or holes and are similar to panels used in the aviation industry for deflecting jet engine blast during airplane takeoff. The panel 62 and the frame 70 spread wave forces and impacts and therefore protect ships and/or the dock wall 8 from damage. The panels 62 can be formed of any suitable materials such as metal, plastic, rubber, and the like.

As noted above, the panels 62 are supported and coupled to the frame 70, and the frame 70 exemplarily has a first wall 73 adjacent the panel 62, an opposite second wall 74, and a plurality of ribs 75 extending between the walls 73, 74. The second wall 74 has a vertical axis curved surface 76 (see vertical axis 77 FIG. 1) that contacts and compresses the fluid container 80 when a wave moves the panel 60 and the frame 70 (described hereinbelow). The curved surface 76 smoothly applies forces to the fluid container 80 as the frame 70 acts on the fluid container 80 and reduces the risk that the frame 70 will puncture the exterior sidewall 81 of the fluid container 80. Note that the length of the ribs 75 near the ends 76' of the curved surface 76 are less than that the length of the ribs 75 near the middle portion 76" of the curved surface 76.

Figure 2:
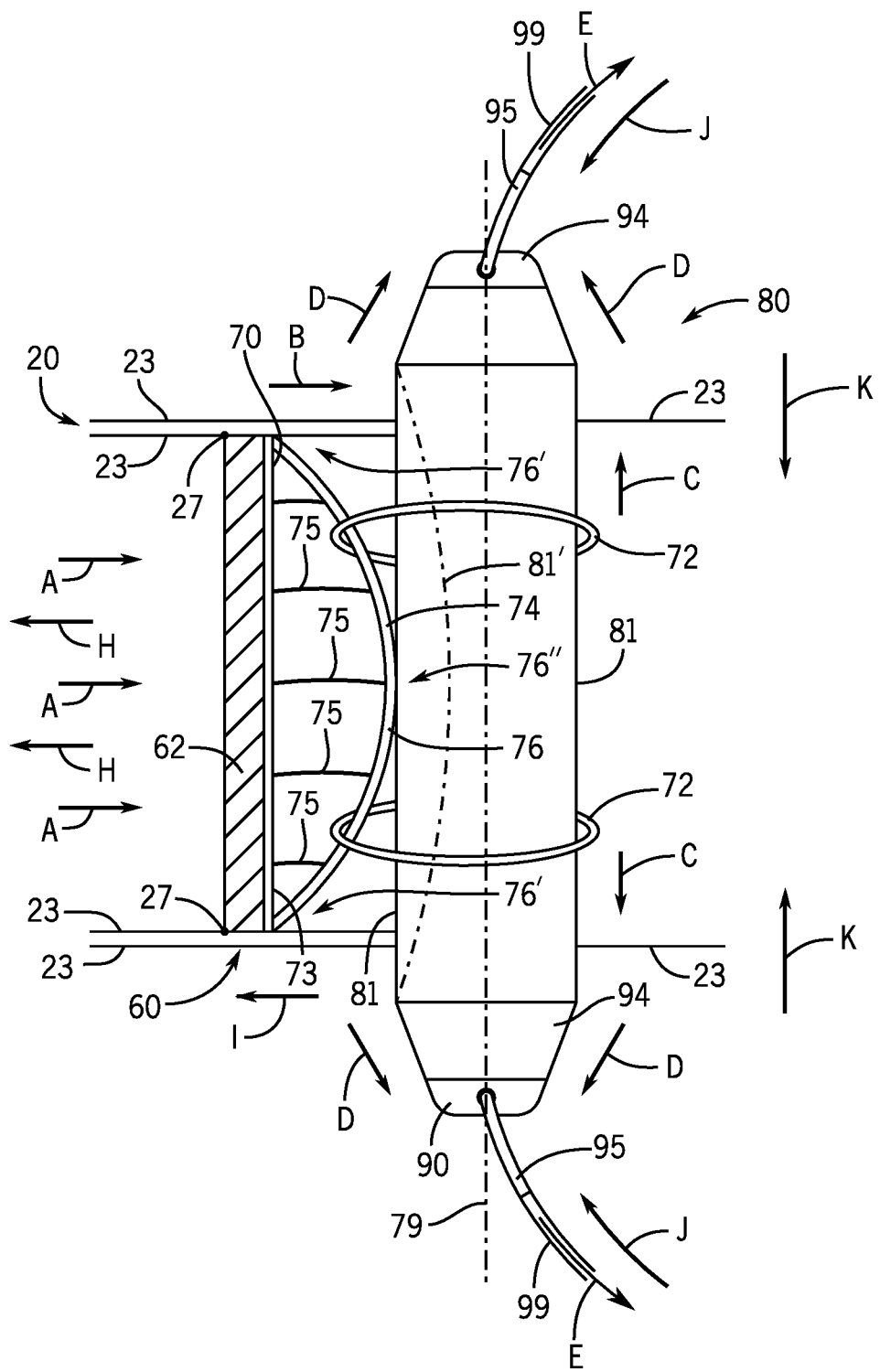
FIG. 2 is a top-down plan view of an exemplary panel assembly.

Generally, the panel 60 and the frame 70 act together to focus or concentrate the wave energy from the wave acting on the panel 60 onto the fluid container 80 via the frame 70. Thus, a larger, collective force can be focused and applied to the fluid container 80 in contrast to permitting the fluid container 80 to be subjected to the waves without the panel 60 and the frame 70. The panel 60 and the frame 70 act on the fluid container 80 to thereby compress the fluid container 80. Note that in the exemplary embodiment depicted in FIG. 2 the bands 72 are coupled to the second wall 74 and the fluid container 80. Also note that dash-dot line in FIG. 2 depicts the exterior sidewall 81' of the fluid container 80 moved radially inwardly toward the center axis 79 as the fluid container 80 is compressed by the frame 70.

Figure 3:
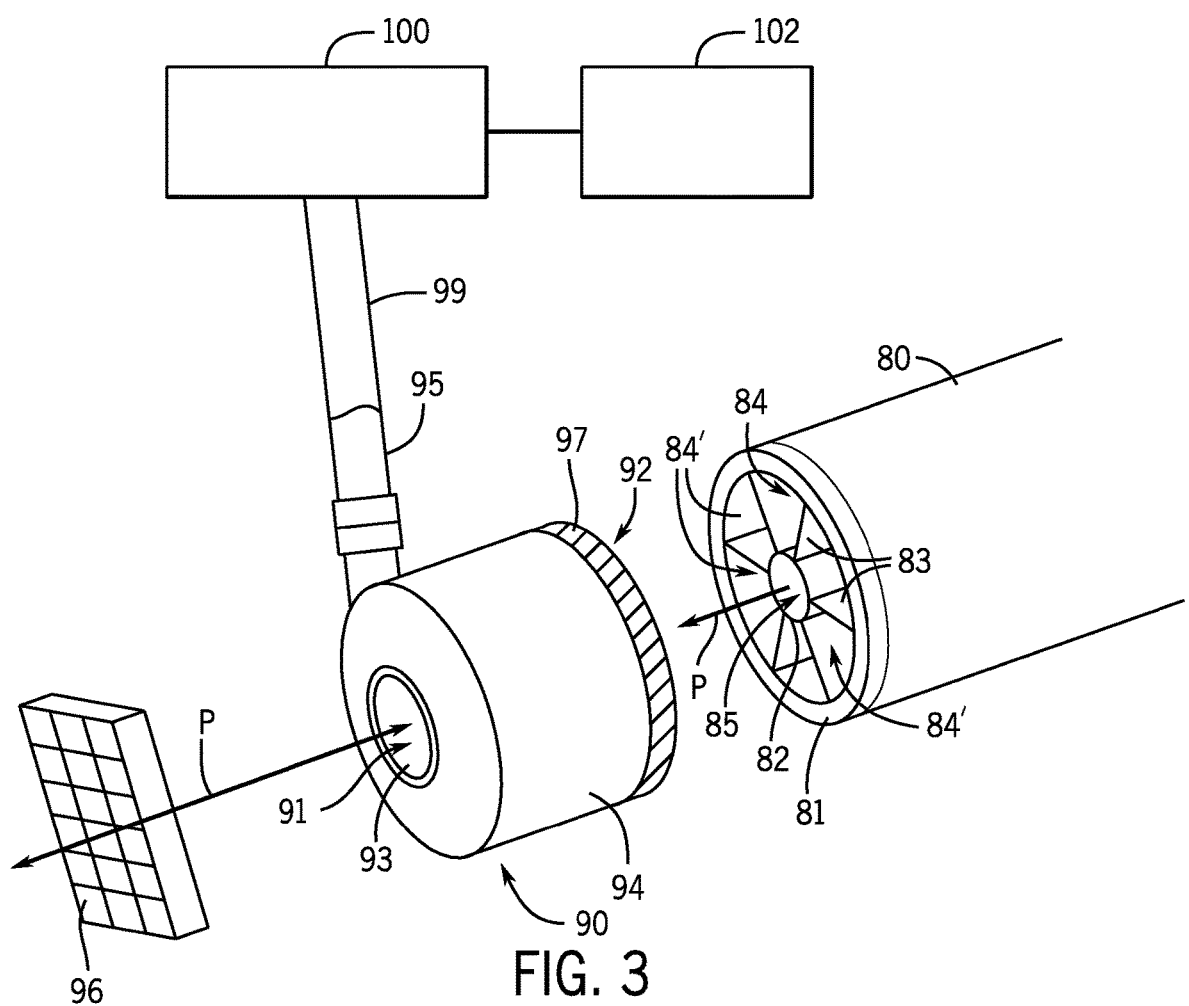
FIGS. 3-4 are exploded perspective views of exemplary resilient fluid containers.

Referring to FIG. 3, the fluid container 80 are exemplarily formed from reinforced elastomeric materials such that the fluid containers 80 flex and deform as the frame 70 acts on and compresses the fluid container 80 (described herein). The fluid container 80 has an exterior sidewall 81, an interior sidewall 82, and a plurality of ribs 83 that extend between the sidewalls 81, 82. As such, a chamber 84 is defined between the sidewall 81, 82. Note that the ribs 83 extend through the chamber 84 and are coupled to the interior sidewall 82. The interior sidewall 82 also defines a bore 85 that extends along the center axis 79 (see FIG. 2) and longitudinal length of the fluid container 80. The bore 85 permits ambient water or air to pass there through. The chamber 84 contains a fluid that moves out of the chamber 84 as the frame 70 compresses the chamber 84 and returns to the chamber 84 as the fluid container 80 decompresses (described further herein). Note that in certain exemplary embodiments, the ribs 83 divide the chamber 84 into sub-chambers 84'.

Figure 4:
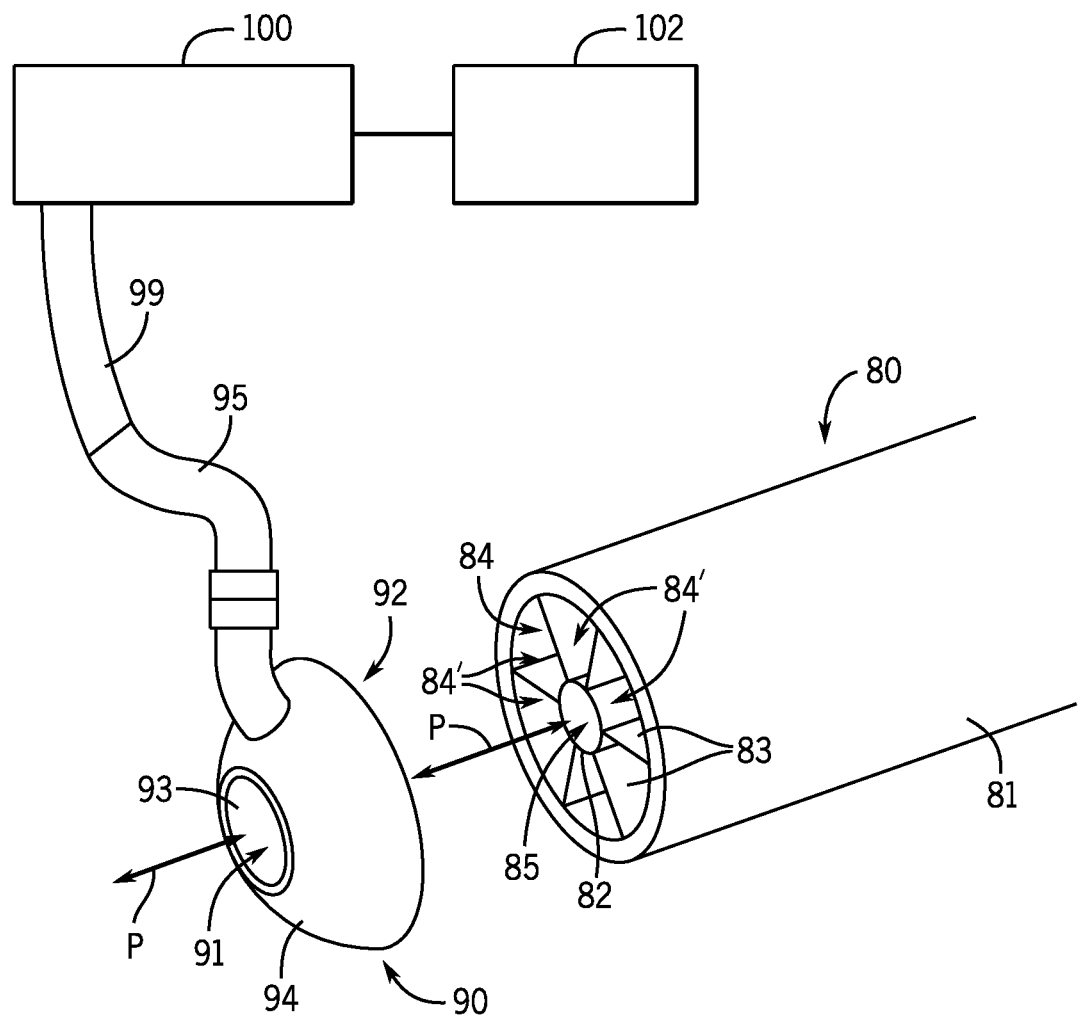
Figure 5:
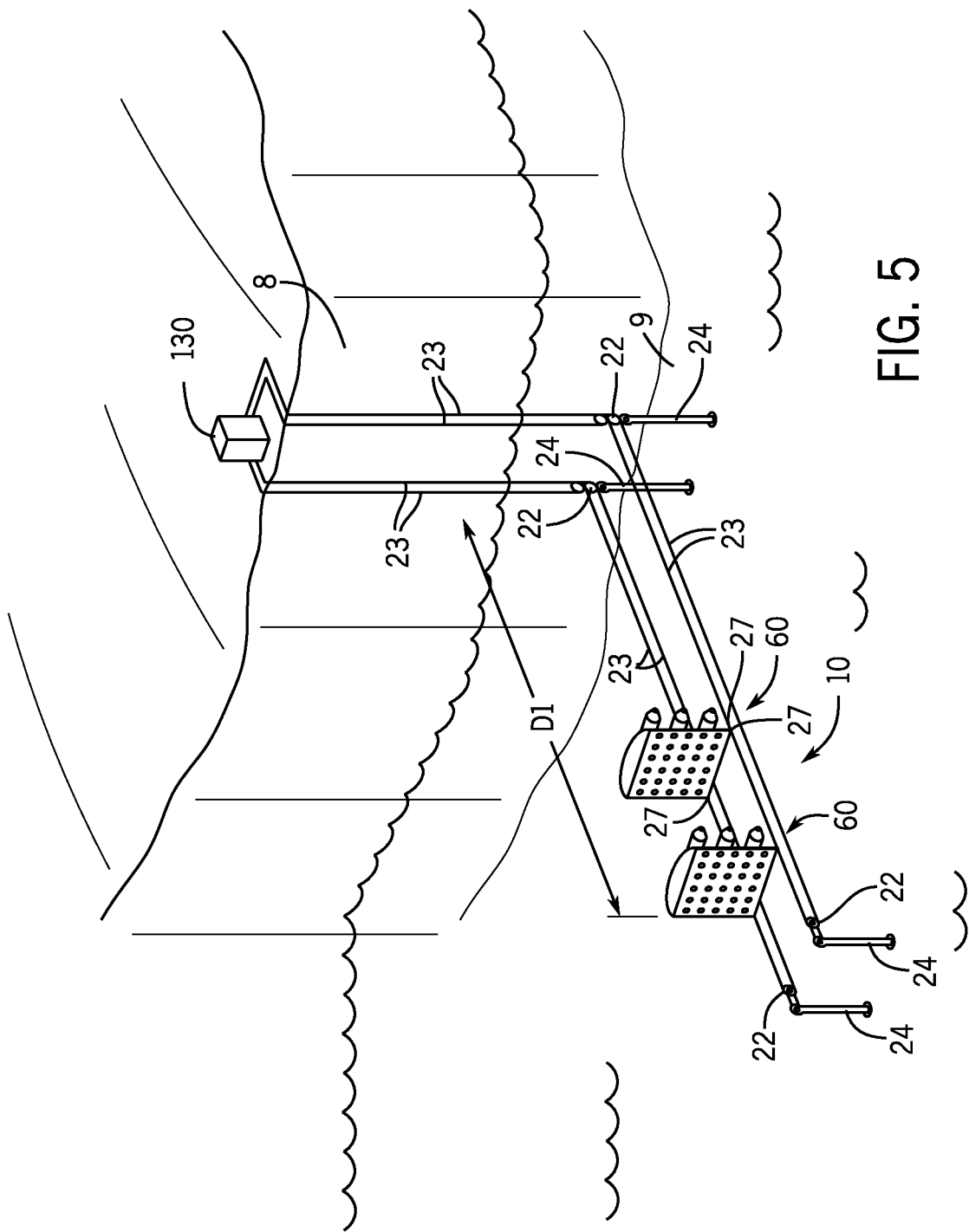
FIG. 5 is a perspective view of another exemplary system according to the present disclosure in an off-shore application.

The fluid container 80 has a cap 90 removably coupled to each end of the fluid container 80. The cap 90 is sized to fit and lock over the end of the fluid container 80. The cap 90 has a bore 91 that aligns with the bore 85 defined by the interior sidewall 82 of the fluid container 80. Thus, ambient water or air passes through the cap 90 and the fluid container 80 (see arrows P). A cavity 92 defined by the cap 90 is in fluid communication with the chamber 84 defined by the sidewalls 81, 82 of the fluid container 80. The bore 91 and the cavity 92 are separated from each other by an inner wall 93, and the cap 90 has an outer wall 94. The cap 90 includes an outlet device 95 coupled to the outer wall 94 that permits the fluid in the cavity 92 and the chamber 84 to flow into and out of the fluid container 80. The chamber 84, the cavity 92, the outlet device 95, and the sealed conduit 99 (described hereinbelow) form a closed fluid path in which the fluid flows. The closed path keeps the fluid is separate from the water. Thus, the chamber 84, the cavity 92, the outlet device 95, the sealed conduit 99, and the energy generating device 100 are part of a closed power generating fluid system. In some exemplary embodiments, a screen 96 is affixed to the outer wall 94 of the cap 90 and is configured to prevent debris or marine life from entering the bore 91 of the cap 90 and the bore 85 of the fluid container 80. In the exemplary embodiment depicted in FIG. 4, the screen 96 is removed. In certain examples, a clamp 97 couples the cap 90 to the fluid container 80. Note that FIG. 4 depicts another exemplary embodiment of the cap 90. Note that in certain examples, the cap 90 connects sub-chambers 84' in the fluid container 80 such that the fluid therein is capable of flowing between the sub-chambers 84'.

Figure 6:
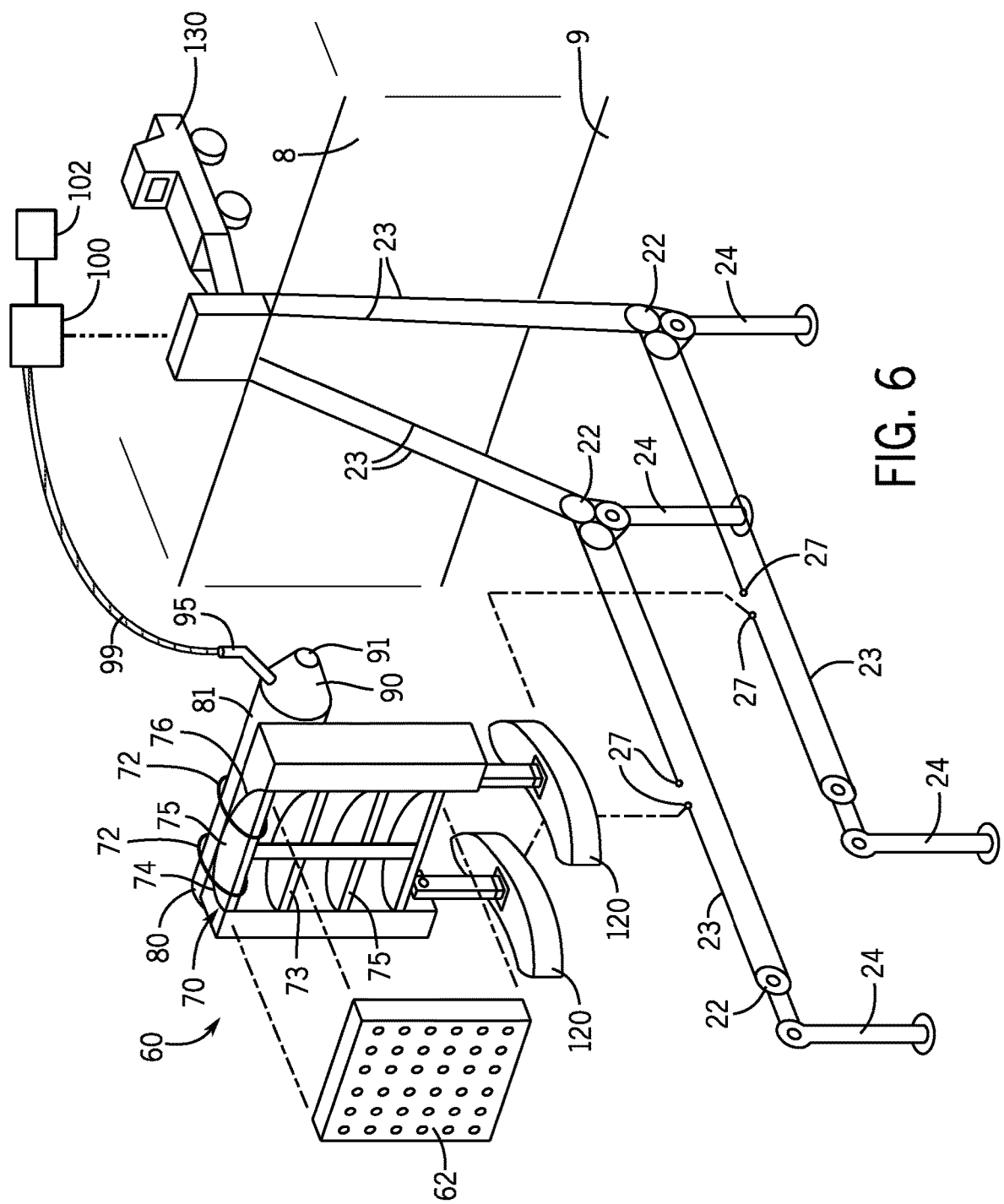
FIG. 6 is a perspective view of another exemplary system according to the present disclosure.

As is briefly noted above, the panel assemblies 60 are capable of generating electrical energy as waves act on and move the panel assemblies 60. The system 10 includes an energy generating device 100 that receives fluid from sealed conduit 99 that extends from the outlet device 95 of the caps 90. The energy generating device 100 converts the flow of the fluid to and from the fluid containers 80 into electrical energy. Exemplary embodiments of the energy generating device 100 include a turbine, in-pipe metering turbine systems, a wells turbine, and/or a side turbine wheels. The generated electrical energy is then transferred from the energy generating device 100 to a power grid or energy storage device 102 (e.g., battery). Generation of the electrical energy is described herein below. Note that FIGS. 1 and 6 depict the energy generating device 100 on top of the dock wall 8 with the conduit 99 extending between the energy generating device 100 and the outlet devices 59. In other examples, the energy generating device 100 could be mounted on the panel assemblies 60 or the support structure 20 or the cap 90 on the ends of the fluid container 80. In these examples, the energy generated by the energy generating device 100 flows along a power cable (not depicted) to the power grid 102.

As noted above, the panel assemblies 60 are at least partially submerged in the water. As a wave acts on the panel 62 (see arrow A on FIG. 2), the curved second wall 74 of the frame 70 moves toward and acts on the outer sidewall 81 of the fluid container 80 (see arrow B on FIG. 2) thereby deforming or compressing the fluid container 80. The panels 62 break the forces of the waves and thereby protect the dock wall 8. As the fluid container 80 is compressed, the fluid container 80 deforms and the fluid in the chamber 84 flows toward the ends of the fluid container 80 (see arrows C on FIG. 2). The moving fluid is captured in the cavities 92 of the caps 90 (see arrow D on FIG. 2) and directed through the outlet device 95 and the conduit 99 (see arrow E on FIG. 2) to the energy generating device 100 where electrical energy is generated.

As the wave recedes (see arrow H on FIG. 2; e.g., the water moves away from the panel 62), the frame 70 is moved away from the fluid container 80 (see arrow I on FIG. 2) thereby permitting the fluid container 80 to elastically expand or decompress back to the uncompressed size and shape of the fluid container 80. Note that in certain examples, the frame 70 is moved by the fluid container 80 as the fluid container 80 elastically returns to its uncompressed shape (e.g., the fluid container 80 decompresses). In another example, the frame 70 is moved by the surrounding water and/or return wave away from the fluid container 80. As the fluid container 80 expands, the fluid is pulled (e.g., "sucked") back into the chamber 84 of the fluid container 80. Thus, movement of the fluid from the energy generating device 100 back into the fluid container generates additional electrical energy as the fluid flows away from the energy generating device 100 back through the conduit 99 to the outlet device 95 (see arrows J on FIG. 2) and into the fluid container 80 (see arrows K on FIG. 2). As such, the energy generating device 100 efficiently generates electrical energy as the fluid flows out of the fluid container 80 and as the fluid flows into the fluid container 80.

Note that the perforations in the panel 62 and other system components, as well as action of expelling ambient water from the bores 85, 91 perpendicular to wave force, stacking of panel assemblies 60, and/or extensions of the panel 62 above top of a stack of panel assemblies 60, may aerate ambient water into foam, which further disperses force of moving water and waves.

Figure 7:
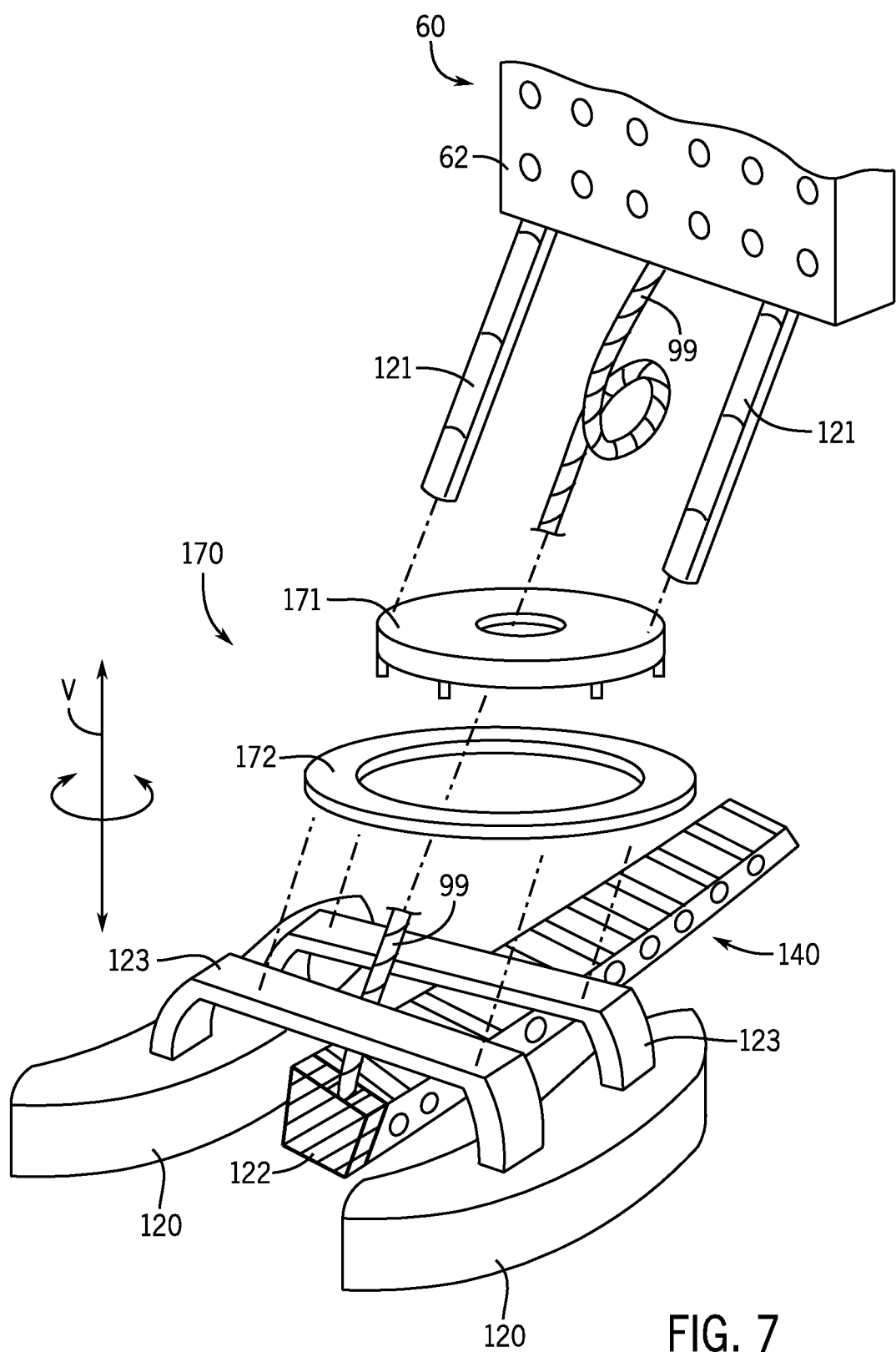
FIG. 7 is another perspective view of feet and arms that support an exemplary panel assembly therefrom. A cable carrier is also depicted.

Referring now to FIG. 6, another exemplary system 10 is depicted. The panel assembly 60 in this exemplary embodiment includes feet 120 that permit movement of the panel assembly 60 along the sea floor 9. The feet 120 reduce bottom erosion of the sea floor 9 and allow fixing of the panel assembly 60 to the feet 120 with angled and telescoping arms 121 (see FIG. 7). The arm 121 may allow for controlled buoyancy for the panel assembly 60 to optimize position in water and/or provide a reciprocating pumping action. In certain exemplary embodiments, a 360 degree rotational turntable 170 (see FIG. 7) is coupled to and sits on the feet 120. Referring to FIG. 7, the turntable 170 has an upper plate 171 to which the arms 121 are coupled and one or more lower rings 172 coupled to cross bars 123 that extend between the feet 120. As such that the plate 171, the arms 121, and the panel assembly 60 are rotatable by an actuator (e.g., motor) about a vertically extending axis (see arrow V) and relative to the lower ring 172, the cross bars 123, and the feet 10. In other exemplary embodiments, the lower ring 172 are coupled to the cable carrier 140. In another exemplary embodiments, the upper plate 171 is enlarged to cover the lower ring 172. Connectors extend from the upper plate 171 couple the upper plate 171 to the lower ring 172 and bearing can be located between the upper plate 171 and the lower ring 172. Thus, the panel assemblies 60 are self-orienting in response to changes in direction of currents and waves to thereby maximize energy generation. These features can be advantageous when the panel assemblies 60 and/or stacks of the panel assemblies 60 are deployed offshore of away from navigational interferences and the dock wall 8. Note that in certain examples, the arms 121 are pivotably coupled to the feet 120 and/or turntable 170 such that that arms 121 can pivot toward or away from the feet 120.

In certain exemplary embodiments, one or more brake mechanisms coupled to the turntable 170 prevent the arms 121 from moving relative to the turntable 170 and in some instances lock the arms 121 and the panel assembly 60 in an upright position. In certain exemplary embodiments, the end 122 and the cable carrier 140 has a stabilizing member that couples to the cross bars 123 to thereby limit wobbling or rocking of the panel assemblies 60. In certain examples, cable carrier 140 is retractable toward the dock wall 8. In certain exemplary embodiments, the cable carrier 140 is locked into a pivot frame near the dock wall 8 and the sections of the cable carrier 140 are nestable with each other and/or the pivot frame. In certain exemplary embodiments, the cable carrier 140 is moveable from a horizontal configuration in which the cable carrier 140 extends along the sea floor 9 and a vertical configuration in which the cable carrier 140 extends vertically along the dock wall 8 thereby retracting the panel assembly 60 toward the dock wall 80 or shoreline. In certain exemplary embodiments, a cable carrier pivot of the cable carrier 140 is positioned near the dock wall 8 and defines a vertical axis about which the cable carrier 140 that extends along the sea floor pivots. In certain exemplary embodiments, a second frame (not depicted) is located on the dock wall side of the fluid container 80. See FIG. 9 in which the depicted lattice structure supporting the panel assemblies 60 is between the panel assemblies 60 and the dock wall 8.

In one exemplary embodiment, deployment of the system 10 may also be accomplished by hollow cable/hose carriers 140 (FIG. 7) modified to be attached to the feet 120 to thereby lock the horizontal position of the system 10 by a mechanism at the bottom anchor 24 next to the dock wall 8 and/or to be driven by mechanism at the dock wall 8 or on the shore. Note that the conduit 99 is routed through the cable carrier 140. The cable carrier 140 may extend from the panel assemblies 60 and attach to the energy generating device 100 that is on shore above the dock wall 8 (see FIG. 1). The cable carriers 140 are capable of extending or retracting from the dock wall 8 while permitting transfer of the fluid and/or power back and forth from the panel assemblies 60 and the power grid 102. In another exemplary embodiment, an on-board autonomous power unit (not depicted) grips and crawls along the cable carrier 140 and thereby moves the panel assemblies 60 relative to the dock wall 8. In certain examples, arms 121 extend between the panel assembly 60 and the feet 120 to thereby support the panel assembly 60. A cross bar 123 extends between the feet 120. In certain examples, the arms 121 and/or the feet 120 are rotatable about a vertical axis V such that the panel assembly 60 can be orientated for optimal energy generation such as orientating the panel assembly 60 for perpendicular or oblique waves relative to the dock wall 8.

Referring to FIG. 6, an exemplary sequence for deploying the system 10 is as follows. Note that components noted below not depicted on FIG. 6 are depicted in FIGS. 1 and 7.

1. Attach anchors 24 in sea floor 9 away from the dock wall 8.
2. Affix cable 23 to offshore anchor 24 with eyes, clamps, and/or shackles (not depicted).
3. Extend the cable 23 to the anchor 24 and movably attach to a pulley 22.
4. Tightening the cable 23 by extending the cable 23 up to top of dock wall 8 for winching and lock to a vehicle or machine 130.
5. For mounting panel assemblies 60 to the cable 23, loosen shore end of cable 23 so it may be hooked offshore of the pulley 22 and loop pulled up so the feet 120 can be hoisted by the machine 130 and/or attached to a loop in the cable 23 or the cable carrier 140 (FIG. 7).
6. As the panel assembly 60 is attached to the cable 23, the cable 23 is pulled tight along sea floor 9 and the dock wall 8. The cable carrier 140 and the conduits 99 are attached to the panel assembly 60. The cable carrier 140 can include drive and carrier pivot locking mechanisms. The cable carrier 140 may extend to the vehicle 130 from a bottom curve guide that is flush with the dock wall 8.
7. Optionally, the cable carrier 140 can be modified to allow a secondary metal carrier to surround main cable carrier 140 to thereby reinforce the cable carrier 140 as the cable carrier 140 pivots. In certain exemplary embodiments, pins extend away from the cable carrier 140 which engage drives allowing extension of the cable carrier 140 with attached panel assembly 60 away from shore.

Another exemplary sequence for deploying the system 10 is as follows.

1. Attach anchor at base of dock wall 8 or sea floor 9.
2. Attach to anchor pivoting and locking track which will allow cable carrier 140 to extend and retract the system 10 by moving the cable carrier 140 up with locked joints parallel to the dock wall 8 when the system 10 is up against the dock wall 8 and allow the system 10 to be extended horizontally with locked joints of the cable carrier 140 away from the dock wall 8 while having power connection to the shoreline.

3. Lower the system 10 with attached cable carrier 140 into the water using a machine 130 and attach to pivoting and locking track.

4. The cable carrier 140 can be modified to allow a secondary metal carrier to surround the cable carrier 140 to thereby reinforce the cable carrier 140 as the cable carrier 140 pivots. In certain exemplary embodiments, pins extend away from the cable carrier 140 which engage drives allowing extension of the cable carrier 140 with attached panel assembly 60 away from shoreline.

5. The pivoting and locking track confines the cable carrier 140 in a curved configuration allowing the pivot from vertical to horizontal by compressing a tab extending from the center of the cable carrier joint that unlocks joint by guiding tab into a tab compression zone along interior surface of pivot and locking track. Sidewall allow for pivoting and then the sidewalls lock the joints as each joint of the cable carrier 140 exits the track.

Figure 8:
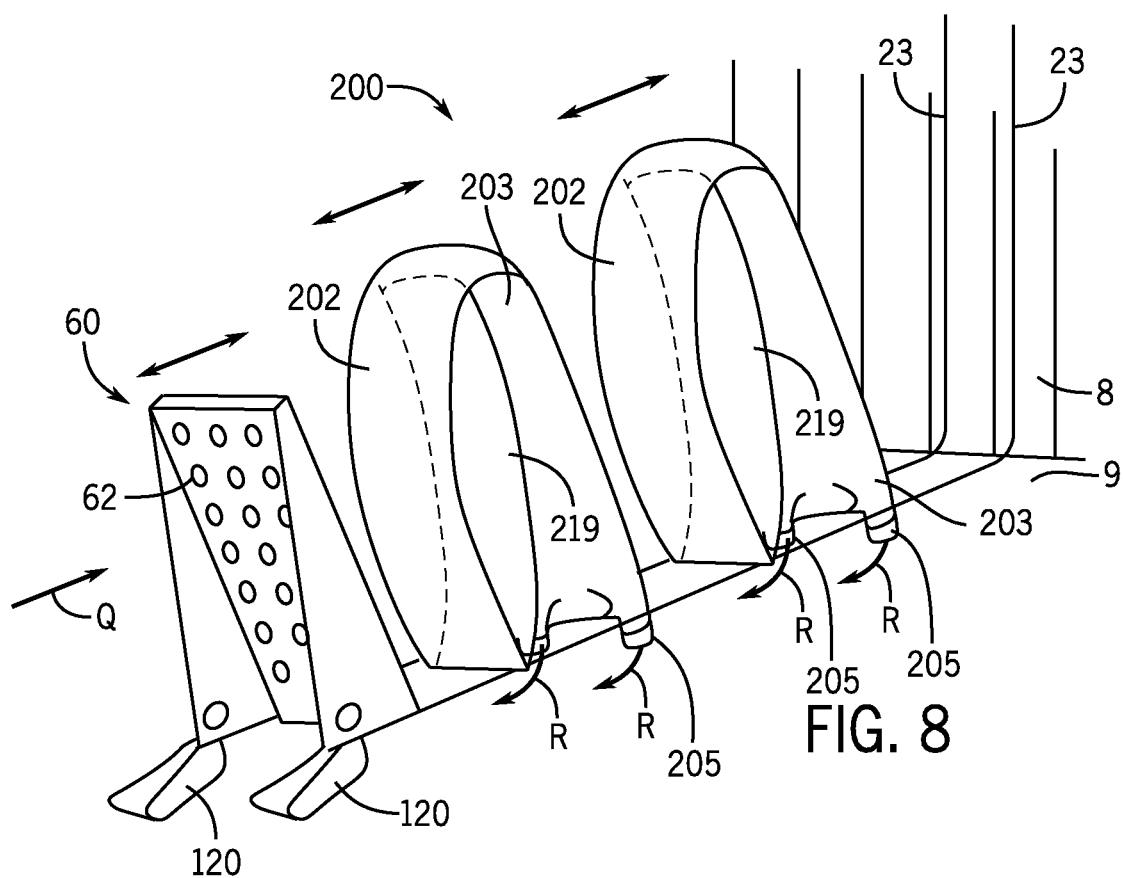
FIG. 8 is a perspective view of an exemplary sediment and erosion management devices according to the present disclosure.

FIG. 8 is a perspective view of an exemplary sediment and erosion management devices according to the present disclosure. The inventor has recognized that sediment and eroded material may form reefs or elevated sea floor areas close to the dock wall 8 that may cause vessels to contact the sea floor (e.g., boats may run aground). Accordingly, it may be advantageous for the system 10 described above to include one or more sediment and erosion management devices 200 that reduce sediment buildup near the dock wall 8. The devices 200 are connected to the shore via the support structure 20 and positioned between another exemplary panel assembly 60 and the dock wall 8. Note that FIG. 8 does not depict the fluid containers 80 for clarity. The shape of the device 200 can vary, and the device 200 is exemplary of a bellows with two connected folded walls defining a cavity 219 into which water may be taken in and expressed. Specifically, the device 200 includes a moving wall 202 connected to a fixed rear wall 203 to provide a secondary, pumping mechanism. The stationary rear wall 203 includes inlets (not shown) that receive ambient water such that the device 200 normally contains water. When a wave moves toward the dock wall 8 (see arrow Q), the front wall 202 is moved toward the rear wall 203 such that the moving walls 202 compresses and expels the water in the cavity 219 via outlets 205. The outlets 205 direct the water in a direction away from the dock wall 8 (see arrow R) and toward the sea floor 9 thereby moving sediments away from the dock wall 8. Note that is some exemplary embodiments, the rear wall 203 is fixed to the cable 23 and the front wall 202 moves relative to the rear wall 203. After the wave passes, the front wall 202 moves away from the rear wall 203 and the water flows into the cavity 219 via the outlets 205 such that the water can be expelled with the next wave. Valves may be provided at the outlets 205 to manage flow of the water in the device 200. In certain examples, attached to the outer surface of the front wall 202 are rails (not depicted) which allow panel assemblies 60 to move horizontally along the bottom of the device 200 while connected to the cables 23 and/or the cable carrier 140.

Figure 9:
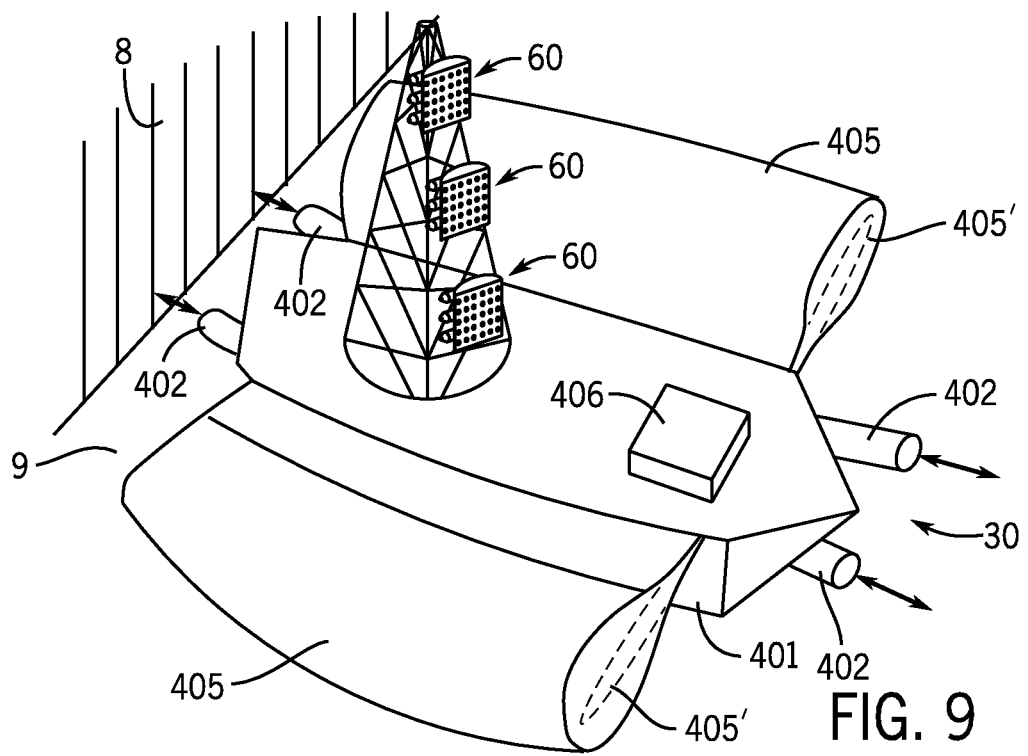
FIG. 9 is a perspective view of an exemplary sled configuration of the present disclosure.
Figure 10:
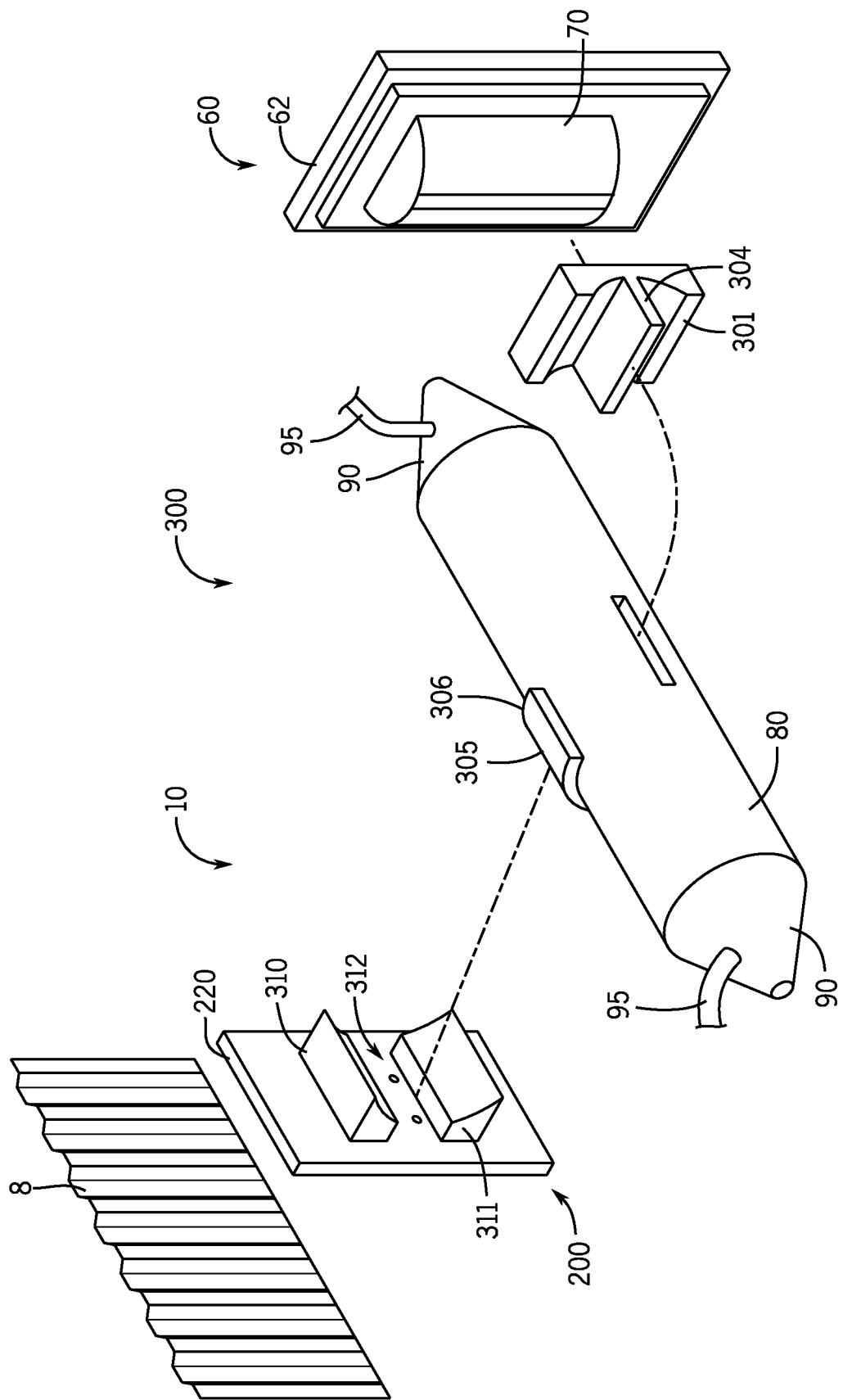
FIG. 10 is an exploded, perspective view of an exemplary collar assembly according to the present disclosure.

FIG. 9 is a perspective view of another exemplary sled 30 configuration of the present disclosure. The sled 30 includes a main body 401 with internal piping 402 that are configured to direct pumped water (described further herein) away from the sled 30 to thereby move the sled 30 and the attached panel assemblies 60 along the sea floor 9 relative to the dock wall 8. The sled 30 include inflatable bladders 405 that can be filled with air to thereby apply upward force against the weight of the sled 30 and in some examples elevate the sled 30 above the sea floor 9 to expose device to more wave energy. Air is pumped into the bladders 405 via pumps on the shore or pumps in a mechanical section 406 of the sled 30. To move the sled 30, the bladders 405 are filled with air such that the weight of the sled 30 is counteracted and the sled 30 is moveable along the sea floor 9 to expose the panel assemblies 60 to more wave energy. Note that dashed lines in FIG. 9 depict the bladders 405' in an evacuated state. Water pumps (not depicted), either on shore or in the mechanical section 406, pump water through the piping 402 to thereby move the sled 30 along the sea floor 9. Once the sled 30 is properly positioned, the air in the bladders 405 is exhausted and the sled 30 rests on the sea floor 9 securely anchored by water column. In certain exemplary embodiments, the functions of the components described with reference to FIGS. 8-9 may be combined to enhance wave energy extraction and work while anchored. The pumped water may also be directed to remove sediment, constituting a programmable untethered self-powered dredging device FIGS. 10-13 depict another exemplary embodiment of the system 10. The system 10 includes one panel assembly 60 and at least one fluid container 80. Note that in other exemplary embodiments, the system 10 includes one or more sediment and erosion management devices 200 (described herein above). Note that the system 10 depicted in FIG. 10 can further include the support structure 20 (see FIG. 1) and/or the sled 30 (see FIG. 1).

Figure 11:
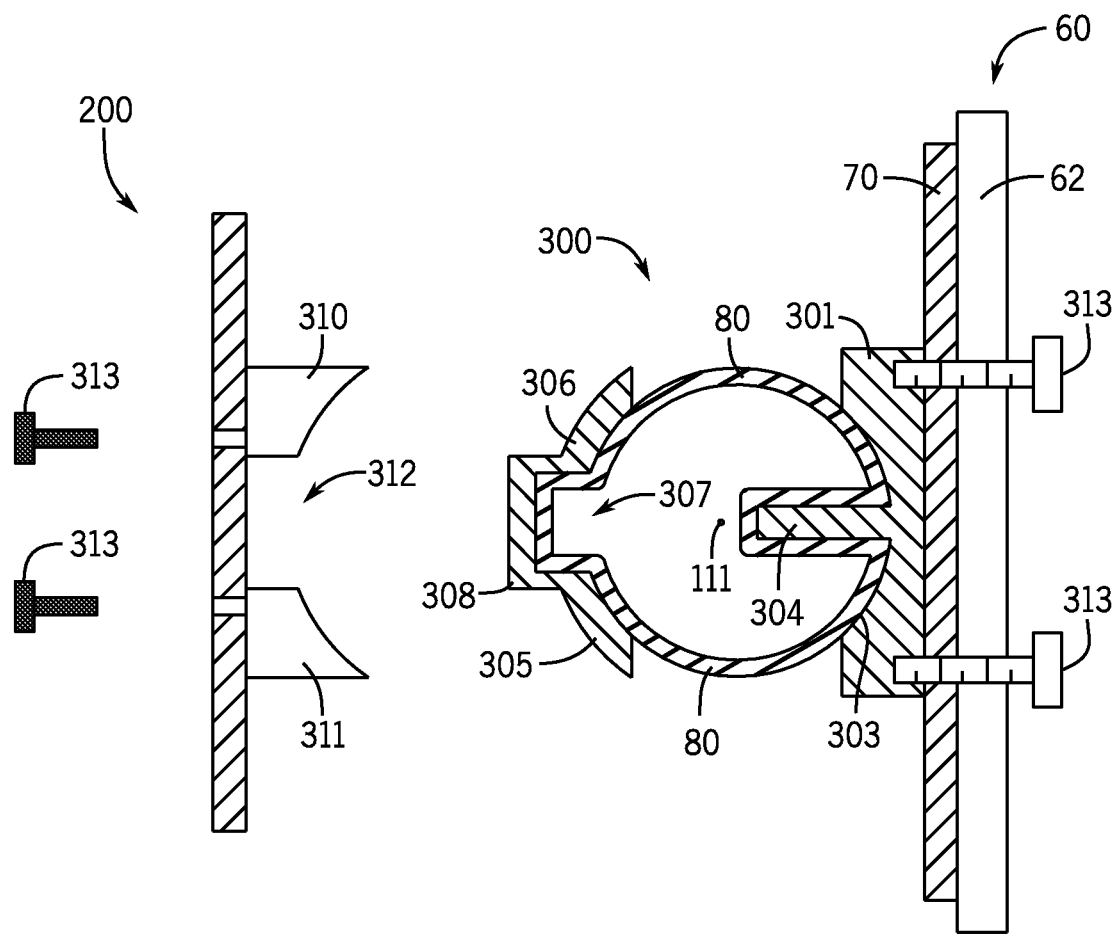
FIG. 11 is a cross-sectional view of an exemplary collar assembly. The collar assembly is in an initial position around the resilient fluid container.
Figure 12:
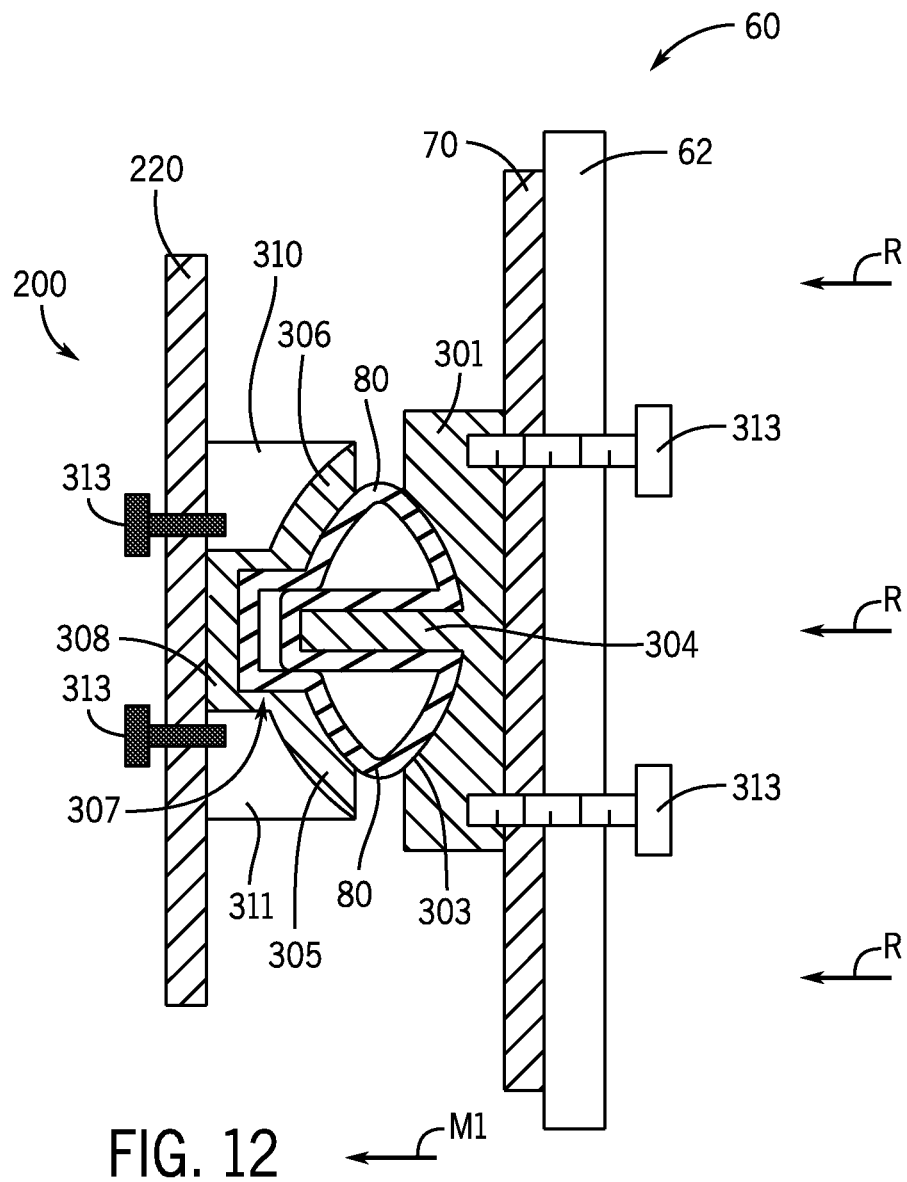
FIG. 12 is a cross-sectional view of the collar assembly of FIG. 11. The collar assembly is in a compressed position around a resilient fluid container.
Figure 13:
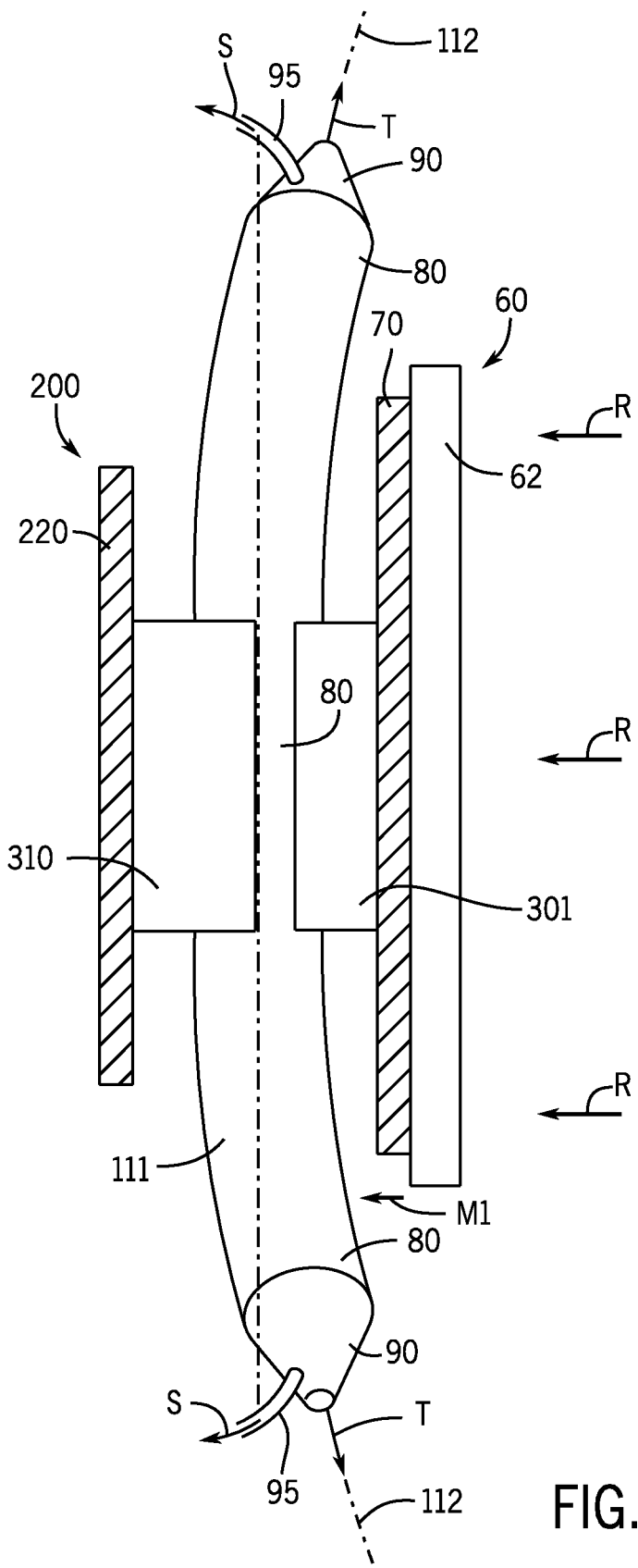
FIG. 13 is an top-down view of the collar assembly of FIG. 11. The collar assembly is in the compressed position around the resilient fluid container.

The system 10 includes a collar assembly 300 that limits the movement of the panel assembly 60 relative to the fluid container 80. As such, the collar assembly 300 limits the amount of force the panel assembly 60 applies to the fluid container 80, and the collar assembly 300 prevents the panel assembly 60 from excessively compressing or pinching the fluid container 80. Note that excessive compression or pinching of the fluid container 80 may damage the fluid container 80 and/or components connected thereto. FIG. 11 depicts the collar assembly 300 in an initial position in which the collar assembly 300 contacts the fluid container 80 that is in an initial uncompressed position. FIGS. 12-13 depicts in the collar assembly 300 in a compressed position and the fluid container 80 in a maximum compressed or pinched position. The collar assembly 300 does not permit the panel assembly 60 to compress or pinch the fluid container 80 past the maximum compressed position.

Referring to FIG. 11, the collar assembly 300 has a first member 301 on the frame 70 of the panel assembly 60. Fasteners 313 (e.g., bolts and nuts) secure the first member 301 to the frame 70. The first member 301 has a generally crescent or semi-circular shaped side 303 and a tab 304 extending from the side 303 in a direction away from the panel assembly 60 and toward the fluid container 80. The fluid container 80 is positioned next to and cradled by the side 303. The tab 304 may contact and/or deform the fluid container 80 as depicted in FIG. 11. In another example, the fluid container 80 is pre-formed with a slot (not shown) that receives the tab 304 of the first member 301.

A second member 305 is opposite the first member 301 and is for interlocking or nesting with the first member 301. The second member 305 has a generally crescent or semi-circular shaped side 306 that extends along the exterior surface of the fluid container 80. A slot 307 in the side 306 is for receiving a portion of the fluid container 80 and/or the tab 304 of the first member 301 as the panel assembly 60 compresses the fluid container 80. Opposite the slot 307 is a second tab 308 that extends toward the sediment and erosion management device 200. Note that in another example, the fluid container 80 is pre-formed with an elongated tab (not shown) that is received in the slot 307 as the panel assembly 60 compresses the fluid container 80. Accordingly, deformation of the fluid container 80 is limited. Note that the fluid container 80 depicted in FIGS. 11-12 does not include the interior sidewall 82 (see FIG. 3).

Upper and lower cradle members 310, 311 on a wall 220 of the device 200 are for cradling the second member 305, the fluid container 80, and the first member 301. Fasteners 313 secure the cradle members 310, 311 on the wall 220. The cradle members 310, 311 define an opening 312 there between. As the panel assembly 60 compresses the fluid container 80, the first member 301, the fluid container 80, and the second member 305 move toward the cradle member 310, 311 (see arrow M1). The size and the shape of the cradle members 310, 311 correspond to the shape of the second member 305 such that the second member 305 fits or seats between the cradle member 310, 311, as described below.

During operation of the system 10, a wave pushes the panel assembly 60 which engages and compresses the fluid container 80 (see arrows R on FIGS. 12-13 depicting the wave movement in a first direction). Continued movement of the panel assembly 60 in the first direction toward the fluid container 80 further compresses the fluid container 80 and causes the fluid container 80 and the first member 301 to move with the second member 305 toward the cradle member 310, 311 (see arrow M1). The opening 312 between the cradle member 310, 311 receives the second tab 308 of the second member 305 and the side 306 of the second member 305 seats against the cradle member 310, 311. Note that sloped surfaces of the cradle member 310, 311 guide the second tab 308 toward the opening 312. As such, the continued movement of the panel assembly 60 toward the cradle member 310, 311 causes the side 303 of the first member 301 to move relative to the side 306 of the second member 305 thereby compressing the fluid container 80 and forcing the fluid therein to flow to the ends of the fluid container 80 and through the outlet devices 95 (see arrows S). The water in the bores 85, 91 of the fluid container 80 is also expelled (see arrows T). The members 301, 305 continue to move toward each other until the members 301, 305 contact each other or the tab 304 is fully within the slot 307 (see FIG. 12). As such the first member 301 and the second member 305, prevent the panel assembly 60 from further compressing the fluid container 80. That is, the collar assembly 300 prevents the panel assembly 60 from excessively compressing and deforming or pinching the fluid container 80. As such, the portion of the fluid container 80 between the first member 301 and the second member 305 is compressed relative to the other portions of the fluid container 80 not located between the members 301, 305 (see FIG. 13, e.g., the diameter of the fluid container 80 between the members 301, 305 is smaller than the diameter of the fluid container 80 near the caps 90). The longitudinal axis 111 along which the fluid container 80 extends between the ends of the fluid container 80 (note a cap 90 is at each end of the fluid container 80) is depicted in FIG. 11, and FIG. 13 depicts the axis 111 when the fluid container 80 is in the uncompressed position. Dash-dot broken lines in FIG. 13 depict the center axis of the bore 91 when the fluid container 80 is in the compressed position. In another exemplary embodiment, the fluid container 80 and the conforming components necessary for device function are arranged such that the fluid container 80 is vertical, nests in the dock wall 8, expels water at bottom only, and circulates fluids only through a cap on the top of the fluid container 80.

Figure 14:
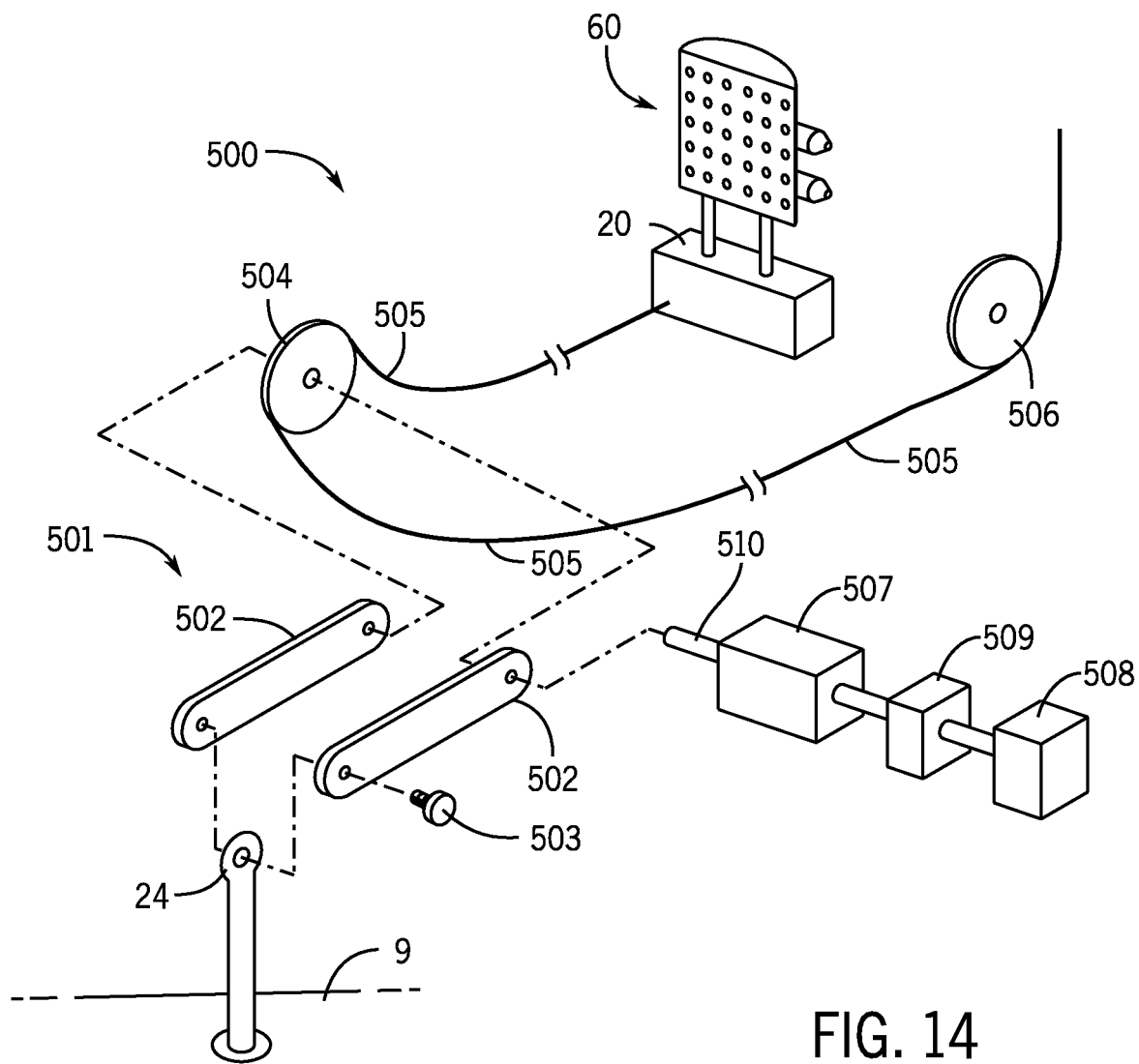
FIG. 14 is a schematic diagram of an exemplary drive system with a drive pulley, a drive belt, and a motor.

FIG. 14 depicts is a schematic diagram of another exemplary drive system 500 for moving the support structure 20 and the panel assembly 60. Note that some of the components are not depicted to scale relative to other components for clarity purposes, and the break lines in the drive belt 505 indicate that the length of the drive belt 505 can vary. The system 500 includes a drive belt 505 that is coupled to the support structure 20 and extends around one or more pulleys 504, 506. In this example, the drive belt 505 extends around a drive pulley 504 and a driven pulley 506. The drive pulley 504 is coupled to a motor 508 via a coupler 509 and a transmission 507 such that the drive pulley 504 can be rotated and the rotational speed controlled by the motor 508. A keyed shaft 510 engages the drive pulley 504. The keyed shaft 510 extends through holes in linkage arms 502. The linkage arms 502 are pivotally coupled to an anchor 24 that is fixed to the sea floor 9. A pin 503 extends through holes in the linkage arms 502 such that the linkage arms 502 and the drive pulley 504 can move relative to the anchor 24.

In certain examples a system for generating energy from waves in a body of water includes a fluid container containing a fluid. When the fluid container is compressed the fluid flows out of the fluid container. A panel is configured to move relative to the fluid container as the waves act on the panel such that the panel acts on and compresses the fluid container. An energy generating device generates electrical energy as the fluid flows out of fluid container. In certain examples, the fluid container elastically expands such that the fluid flows back into the fluid container such that the energy generating device generates electrical energy as the fluid flows back into the fluid container. In certain examples, the fluid container and the energy generating system form a closed path along which the fluid flows. In certain examples, the panel is fully submerged in the body of water. In certain examples, the energy generating system is a turbine. In certain examples, the fluid container has an interior sidewall and an exterior sidewall. The exterior sidewall is spaced apart from the interior sidewall such that the interior sidewall and the exterior sidewall define a chamber therebetween in which the fluid is contained. In certain examples, the interior sidewall defines a bore that permits ambient water to pass therethrough. In certain examples, the fluid container has ribs that extends between the interior sidewall and the exterior sidewall. In certain examples, the ribs divide the chamber into sub-chambers. In certain examples, the fluid container has a cap that connects the sub-chambers to each other such that the fluid is capable of flowing between the sub-chambers.

In certain examples, a frame is coupled to the panel. The frame being configured to engage and compress the fluid container as the waves act on the panel. In certain examples, bands couple the frame to the fluid container. In certain examples, the frame has a curved surface that engages the fluid container. In certain examples, the frame has a first wall and an opposite second wall. The first wall is coupled to the panel and the second wall defines the curved surface. The frame has ribs that extend between the first wall and the second wall. In certain examples, a support structure is configured to the support the panel and the fluid container in the body of water. In certain examples, the panels are configured to move relative to the support structure as the waves act on the frame. In certain examples, the panels are moveable relative to the support structure such that the panels face the waves. In certain examples, he panels are rotatable relative to the support structure to face the waves.

In certain examples, the support structure includes a track and a sled. The panel is coupled to the sled, and the sled moves along the track. In certain examples, the sled is configured to receive compressed air to thereby increase the buoyancy of the panel.

In the present description, certain terms have been used for brevity, clarity, and understanding. No unnecessary limitations are to be inferred therefrom beyond the requirement of the prior art because such terms are used for descriptive purposes and are intended to be broadly construed. The different apparatuses, systems, and method steps described herein may be used alone or in combination with other apparatuses, systems, and methods. It is to be expected that various equivalents, alternatives and modifications are possible within the scope of the appended claims.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for generating energy from waves in a body of water, the system comprising:
    a fluid container containing a fluid, wherein when the fluid container is compressed the fluid flows out of the fluid container;
    a panel configured to move relative to the fluid container as the waves act on the panel such that the panel acts on and compresses the fluid container;
    an energy generating device that generates electrical energy as the fluid flows out of the fluid container;
    a frame coupled to the panel, and wherein the frame is configured to engage and compress the fluid container as the waves act on the panel; and
    bands that couple the frame to the fluid container.

2. The system according to claim 1, wherein the fluid container elastically expands such that the fluid flows back into the fluid container, and wherein the energy generating device generates electrical energy as the fluid flows back into the fluid container.

3. The system according to claim 2, wherein the fluid container and the energy generating system form a closed path along which the fluid flows.

4. The system according to claim 1, wherein the panel is fully submerged in the body of water.

5. The system according to claim 1, wherein the energy generating system is a turbine.

6. The system according to claim 1, wherein the fluid container has an interior sidewall and an exterior sidewall, wherein the exterior sidewall is spaced apart from the interior sidewall such that the interior sidewall and the exterior sidewall define a chamber therebetween in which the fluid is contained.

7. The system according to claim 6, wherein the interior sidewall defines a bore, and wherein the bore is configured to permit ambient water to pass therethrough.

8. The system according to claim 6, wherein the fluid container has ribs that extend between the interior sidewall and the exterior sidewall.

9. The system according to claim 8, wherein the ribs divide the chamber into sub-chambers; and
    wherein the fluid container has a cap that connects the sub-chambers to each other such that the fluid is capable of flowing between the sub-chambers.

10. The system according to claim 1, wherein the frame has a curved surface that engages the fluid container.

11. The system according to claim 1, further comprising a support structure configured to support the panel and the fluid container in the body of water.

12. The system according to claim 11, wherein the panel is configured to move relative to the support structure as the waves act on the panel.

13. The system according to claim 11, wherein the panel is moveable relative to the support structure such that the panel faces the waves.

14. The system according to claim 13, wherein the panel is rotatable relative to the support structure to face the waves.

15. A system for generating energy from waves in a body of water, the system comprising:
    a fluid container containing a fluid, wherein when the fluid container is compressed the fluid flows out of the fluid container;
    a panel configured to move relative to the fluid container as the waves act on the panel such that the panel acts on and compresses the fluid container;
    an energy generating device that generates electrical energy as the fluid flows out of the fluid container; and
    a frame coupled to the panel, and wherein the frame is configured to engage and compress the fluid container as the waves act on the panel, wherein the frame has a curved surface that engages the fluid container and the frame has a first wall and an opposite second wall;
    wherein the first wall is coupled to the panel and the second wall defines the curved surface; and
    wherein the frame has ribs that extend between the first wall and the second wall.

16. A system for generating energy from waves in a body of water, the system comprising:
    a fluid container containing a fluid, wherein when the fluid container is compressed the fluid flows out of the fluid container;
    a panel configured to move relative to the fluid container as the waves act on the panel such that the panel acts on and compresses the fluid container;
    an energy generating device that generates electrical energy as the fluid flows out of the fluid container; and
    a support structure configured to support the panel and the fluid container in the body of water, wherein the support structure includes a track and a sled;
    wherein the panel is coupled to the sled; and
    wherein the sled moves along the track.

17. The system according to claim 16, wherein the sled is configured to receive compressed air to thereby increase the buoyancy of the panel.

* * * * *